US009606522B2

(12) United States Patent
Hoffman

(10) Patent No.: US 9,606,522 B2
(45) Date of Patent: Mar. 28, 2017

(54) DEVICE FOR CONTROLLING A COFFEE MAKER

(71) Applicant: Ronald J. Hoffman, Solon, OH (US)

(72) Inventor: Ronald J. Hoffman, Solon, OH (US)

( * ) Notice: Subject to any disclaimer, the term of this patent is extended or adjusted under 35 U.S.C. 154(b) by 960 days.

(21) Appl. No.: 13/915,789

(22) Filed: Jun. 12, 2013

(65) Prior Publication Data
US 2014/0005834 A1 Jan. 2, 2014

Related U.S. Application Data

(60) Provisional application No. 61/658,990, filed on Jun. 13, 2012.

(51) Int. Cl.
| B23K 9/067 | (2006.01) |
| B23K 9/073 | (2006.01) |
| H05B 1/00 | (2006.01) |
| H05B 3/00 | (2006.01) |
| H05B 7/00 | (2006.01) |
| H05B 11/00 | (2006.01) |
| G05B 19/042 | (2006.01) |
| A47J 31/52 | (2006.01) |

(52) U.S. Cl.
CPC .......... G05B 19/042 (2013.01); A47J 31/52 (2013.01)

(58) Field of Classification Search
CPC ... G05B 19/042; G05D 23/1912; A47J 31/52; A47J 31/56; A47J 31/402; A47J 42/08; A47J 31/42; A47J 31/002; A23F 5/262

USPC .......... 700/275, 725; 219/50, 492, 497, 501, 219/506, 508; 392/478, 485; 99/280, 99/281, 282, 283, 285, 286; 426/433
See application file for complete search history.

(56) References Cited

U.S. PATENT DOCUMENTS

| 4,493,981 A * | 1/1985 | Payne | F24C 15/106 219/448.12 |
| 4,506,827 A * | 3/1985 | Jamieson | G05D 23/1917 165/268 |
| 4,568,821 A * | 2/1986 | Boe | G05D 23/1905 219/419 |
| 4,634,842 A * | 1/1987 | Payne | F24C 15/106 219/486 |
| 4,782,215 A * | 11/1988 | Kadwell | G05D 23/1917 219/494 |
| 4,829,161 A * | 5/1989 | Kadwell | G05D 23/1917 219/494 |
| 4,899,034 A * | 2/1990 | Kadwell | G05D 23/1917 219/494 |

(Continued)

Primary Examiner — Eric Stapleton
(74) Attorney, Agent, or Firm — Walter | Haverfield LLP; D. Peter Hochberg; Sean F. Mellino

(57) ABSTRACT

A control module suitable for controlling a manual switch type automatic drip coffeemaker (ADC) enabling the addition of fully automatic brewing start, programmable brewing strengths, programmable heater levels for keeping the coffee warm after the brewing cycle is complete, programmable shut-off time periods, automatic cleaning detector, automatic self cleaning cycle with automatic shut-off, and programmable twelve hour AM/PM or twenty-four hour time format. The control module contains a micro-controller, application specific firmware, a keypad, a liquid crystal display, a control relay, a current or a voltage sensor, indicator LED's, a piezo audible alarm, and power supply components.

42 Claims, 8 Drawing Sheets

(56) References Cited

U.S. PATENT DOCUMENTS

| | | | | |
|---|---|---|---|---|
| 4,935,607 A * | 6/1990 | Kadwell | G05D 23/1917 | 219/494 |
| 4,994,653 A * | 2/1991 | Kadwell | G05D 23/1917 | 219/494 |
| 5,117,092 A * | 5/1992 | Shimizu | D06F 79/026 | 219/247 |
| 5,126,537 A * | 6/1992 | Kadwell | G05D 23/1917 | 219/497 |
| 5,162,038 A * | 11/1992 | Wilker | A61G 11/00 | 119/306 |
| 5,183,998 A * | 2/1993 | Hoffman | G05D 23/1912 | 219/492 |
| 5,207,148 A * | 5/1993 | Anderson | A47J 31/36 | 137/893 |
| 5,244,146 A * | 9/1993 | Jefferson | G05D 23/1909 | 165/269 |
| 5,417,145 A * | 5/1995 | Joseph, Jr. | A47J 42/44 | 241/33 |
| 5,616,269 A * | 4/1997 | Fowler | H05B 6/6461 | 219/492 |
| 5,660,336 A * | 8/1997 | Joseph, Jr. | A47J 42/44 | 241/27 |
| 5,710,408 A * | 1/1998 | Jones | B64D 15/22 | 219/213 |
| 5,805,767 A * | 9/1998 | Jouas | G05D 23/1902 | 219/506 |
| 5,862,738 A * | 1/1999 | Warne | A47J 31/007 | 99/281 |
| 5,866,880 A * | 2/1999 | Seitz | F24H 9/2028 | 219/483 |
| 5,877,957 A * | 3/1999 | Bennett | G05B 19/042 | 340/286.01 |
| 5,895,595 A * | 4/1999 | Haden | A47J 31/4439 | 219/428 |
| 6,080,971 A * | 6/2000 | Seitz | F24H 9/2028 | 219/483 |
| 6,133,555 A * | 10/2000 | Brenn | A47F 10/06 | 219/483 |
| 6,246,831 B1 * | 6/2001 | Seitz | F24H 9/2021 | 219/483 |
| 6,294,765 B1 * | 9/2001 | Brenn | A47F 10/06 | 219/483 |
| 6,869,538 B2 * | 3/2005 | Yu | A61M 1/28 | 210/143 |
| 6,912,427 B1 * | 6/2005 | Pattee | G05B 19/042 | 318/600 |
| 7,153,286 B2 * | 12/2006 | Busby | A61M 1/28 | 210/252 |
| 7,279,660 B2 * | 10/2007 | Long | A47J 31/20 | 219/438 |
| 7,657,961 B2 * | 2/2010 | Shank | B05B 9/002 | 15/250.01 |
| 7,745,759 B2 * | 6/2010 | Long | A47J 31/20 | 219/214 |
| 8,615,374 B1 * | 12/2013 | Discenzo | G01D 21/02 | 219/497 |
| 8,692,165 B2 * | 4/2014 | Geockner | A47J 31/44 | 219/482 |
| 2006/0169687 A1 * | 8/2006 | Geockner | A47J 31/44 | 219/435 |
| 2009/0001070 A1 * | 1/2009 | Scott | A47J 27/21083 | 219/438 |
| 2009/0173235 A1 * | 7/2009 | Kollep | A47J 31/4482 | 99/279 |
| 2010/0107232 A1 * | 4/2010 | Grohman | G05B 19/042 | 726/7 |
| 2010/0114380 A1 * | 5/2010 | Kates | F24F 11/0086 | 700/275 |
| 2010/0198411 A1 * | 8/2010 | Wolfson | G05B 15/02 | 700/275 |
| 2010/0206869 A1 * | 8/2010 | Nelson | F24D 11/02 | 219/494 |
| 2010/0270284 A1 * | 10/2010 | Cohen | A47J 27/21175 | 219/429 |
| 2011/0058798 A1 * | 3/2011 | Garvey | A47J 27/2105 | 392/444 |
| 2013/0016462 A1 * | 1/2013 | Howitt | A47J 27/2105 | 361/679.01 |
| 2013/0197471 A1 * | 8/2013 | Williams | A61M 3/0229 | 604/500 |
| 2013/0201316 A1 * | 8/2013 | Binder | H04L 67/12 | 348/77 |
| 2014/0005834 A1 * | 1/2014 | Hoffman | A47J 31/52 | 700/275 |

* cited by examiner

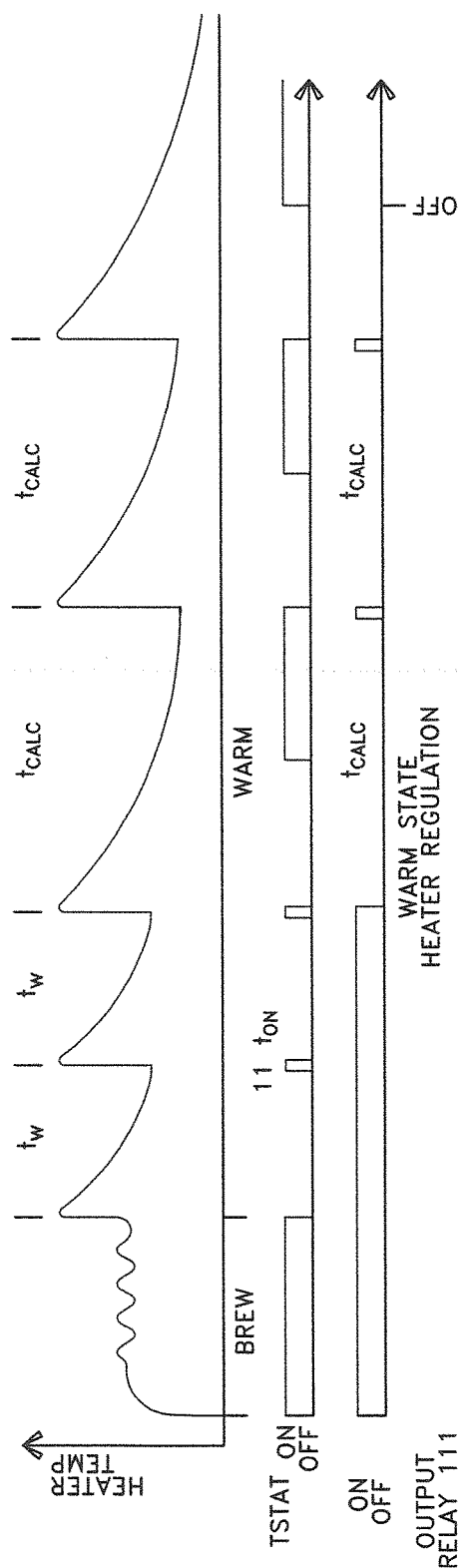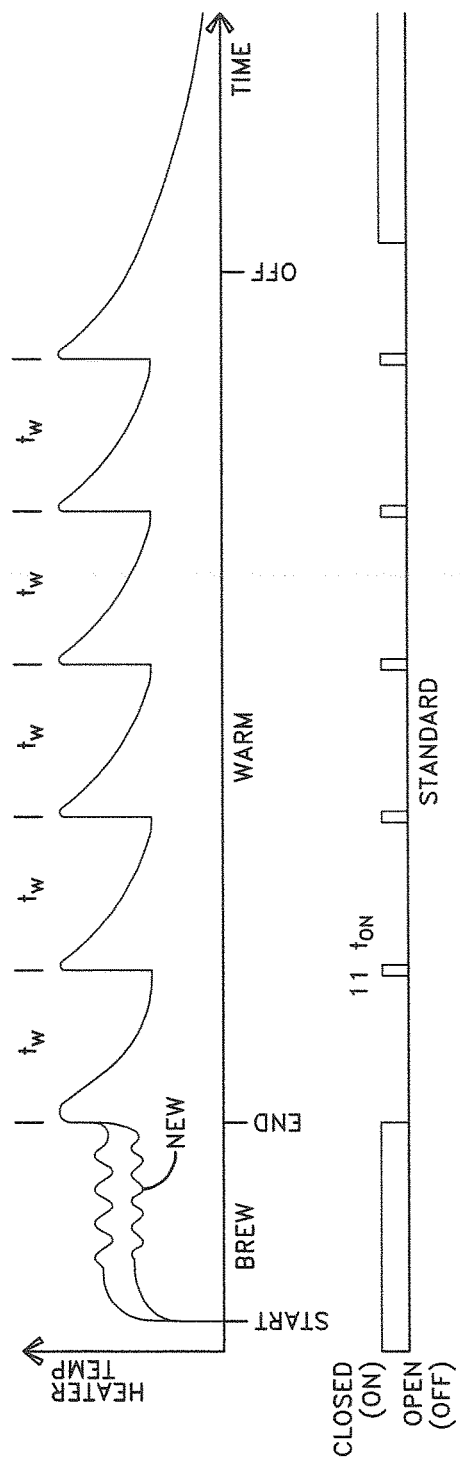

DEVICE FOR CONTROLLING A COFFEE MAKER

CROSS REFERENCE TO RELATED APPLICATION

This application claims priority of U.S. Provisional Application No. 61/658,990, filed Jun. 13, 2012, under Title 35, United States Code, Section 119(e), which is incorporated by reference herein in its entirety.

BACKGROUND OF THE INVENTION

Field of the Invention

This invention relates to controls for electric coffee makers, and in particular to a control module for manual switch-type automatic drip coffee machines.

Description of the Prior Art

In 1993, U.S. Pat. No. 5,183,998 (Hoffman et al., "the '998 patent") was issued describing an automatic electric coffee maker or the like having user selectable AUTO, BREW, WARM or OFF states. The control used a triac to provide full power to brew the coffee, and reduced power which could be user adjusted to set the WARM temperature level. A temperature sensor could determine if the machine should be cleaned and to determine if the BREW state was complete and automatically convert to the WARM state, and to turn the machine OFF if the WARM temperature was too high.

The temperature sensor and the triac that were used posed several problems. The triac required a heat sink to dissipate the heat generated by the heater current. The triac could fail in a shorted condition that would require the thermal fuses to open and render the coffeemaker inoperable. The temperature sensor needed special mounting to react quickly enough to the heater temperature. The heater temperature control potentiometer could become dirty and cause erratic operation in the WARM state. The increased performance was offset by reliability and product cost issues.

SUMMARY OF THE INVENTION

The problem to be addressed is how to offer all of the advanced features discussed in the '998 patent without using a triac or a thermal sensor. Since standard coffee makers use a bi-metal thermostat to regulate the temperature, a method to control the coffee maker by monitoring the ON-OFF condition of the thermostat is required. Additionally, there are two ways to monitor the thermostat condition. The first way is by connecting a wire to a point between the thermostat and the heater load and detecting a voltage across the load when the thermostat is closed. When the thermostat is open, there is no voltage across the heater load. The first way requires an additional wire to monitor the thermostat. A second way for monitoring the thermostat is by sensing the current drawn through the heater load when the thermostat is closed. This method offers two distinct advantages. One, the current sensing approach does not require an additional wire in order to monitor the thermostat condition. Second, it allows the current being passed to the coffee maker to be monitored externally. This allows the coffee maker control unit to be separate from the coffee maker. Therefore, it becomes a universal method to monitor and control any brand, model or size of automatic electric coffee maker. Now, any simple ON-OFF switch-type a coffee maker can be controlled to provide advanced features. The coffee maker controller "(CMC)" with a CMC receptacle could now be plugged into an AC receptacle and the coffee maker plugged into the CMC receptacle. A further advantage to this approach is that if the coffee maker should fail, it can be easily be replaced with a dower cost switch type electric coffee maker and just plugged into the CMC. No reprogramming is required, and the cost savings are substantial.

To enable the features and abilities of the latter approach, special hardware and firmware algorithms are needed for detecting the condition of the thermostat. By knowing the condition of the thermostat, logic and math algorithms have been developed to operate a controlling relay that provides the advanced features desired in the coffee maker controller.

The present invention in its preferred form relates to the control of automatic drip coffee makers. Referring to FIG. 2, an electric, automatic drip coffee maker 200 ("ADC") is comprised of a water chamber 201, which holds a charge of water, a unidirectional check valve 203, located between the water chamber and a heater assembly 205, a discharge tube 204 and diverter 207, to carry the heated water up to an infusion chamber 209 or coffee basket that holds the coffee grounds, and a carafe 211 to receive the infused coffee. The carafe sits on top of the heater assembly 205 to transfer heat to keep the coffee warm after the brewing is complete.

The brewing cycle of the automatic coffee maker 200 begins by filling the water chamber 201 with a carafe 211 of water. The water goes through unidirectional check valve 203 and a tube 210 that connects to the heater assembly 205. A heater or heater/tube assembly 300 (refer to FIG. 3 and FIG. 3A) is comprised of a heater 313 and a preferably extended heater water tube 301 that are contained within a dual cavity, extruded aluminum extrusion tube 311. Aluminum extrusion tube 311, including water tube 301 and heater 313, are all bent into a "U" shape and compressed against an aluminum plate 212 (FIG. 2) on which carafe 211 rests. Plate 212 is supported by a thermoplastic ring 213 that mounts heater assembly 205 to a plastic coffee maker housing 214. Connected to the aluminum extrusion tube 311 is a bi-metal thermostat 309 that opens when the temperature of water tube 301 gets too high and closes again at some lower differential temperature. Also connected to the aluminum extrusion tube 311 are one or two thermal safety fuses 305 and 307, which act as a safety shut-off if thermostat 309 should fail closed and the temperature of aluminum extrusion tube gets too hot. Thermal fuse 305 is electrically connected to thermostat 309 and to a voltage sample point 317, and thermal fuse 307 (if provided) is connected to a voltage sample point 319 and to a 120 volt AC plug 320. Thermostat 309 and plug 320 are connected to an ON-OFF switch 303. Again referring to FIG. 2, when ADC 200 is powered ON, the water in water tube 301 of heater assembly 205 is heated until it turns to steam. The check valve 203 prevents reverse flow into the water chamber 201 so that the boiling water is forced up through the discharge tube 204 and diverter 207, to the infusion chamber 209. The boiling water extracts the flavor molecules from the coffee grounds, tea, or herbal matter, and passes through a filter and opening at the bottom of the infusion chamber 209, into the carafe 211, below. When all of the water has been pumped into the carafe, the water tube 301 heats rapidly and the thermostat 309 opens, disrupting power to the heater 313. After the heater assembly 300 cools down, the thermostat 309 closes and the rapid temperature of heater assembly 300 rises again and causes the thermostat 309 to open. This process repeats continuously until an ON-OFF switch 303 or 206 is turned OFF.

One of the problems with this type of coffee maker is that a mineral scale 315 (FIG. 3), can build up in the water tube 301 from calcium and magnesium minerals in the water. After enough brewing cycles, sufficient mineral scale is built up that prevents heat to transfer efficiently to the water in the water tube 301. As a result, the thermostat 309 sees a high enough temperature that it opens. Because there is still water in the water tube 301, the heater assembly 300 cools rapidly causing the thermostat 309 to close. This also creates excessive steaming, a prolonged brewing time, and in extreme cases degrading of the water tubes 301 and thermoplastic parts around the heater assembly 300.

Another problem with ADC coffee makers is the keep warm temperature. To ensure proper brewing, the manufacturer must balance the heater power level, the thermostat trip temperature, the heat transfer from the heater tube to the thermostat, temperature limits of materials housing the heater assembly, and other factors. Generally, they seek to maintain a brewing time below 10 minutes for a full carafe of water and a WARM temperature of 180 to 190 degrees F, (82.2° to 87.8° C.). This temperature causes the aromatic hydrocarbons to evaporate quickly because of their low vapor pressure. This leaves the coffee tasting bitter after only an hour or less. Some manufacturers have even built a one hour display which indicates when the coffee is bad and should be thrown out and brewed again.

Another shortcoming of ADC coffee makers is the brewing strength. When the user makes a half a pot of coffee, the brewing time can be as little as four minutes. Full flavor extraction cannot be obtained. Some brands have included a diode switched into the circuit to reduce the power to half. This is not desirable for several reasons. First, half wave rectification causes magnetization issues on power pole transformers. Second, excessive heat can be dissipated by the power diode. Third, it only offers two choices, full power or half power.

An object of the invention is to improve the operation of electric coffee makers.

A further object is to improve the controls of electric coffee makers

Another object of the invention is to monitor and control electrical components of circuitry in electric coffee makers.

It is also an object of the invention to monitor the condition of a thermostat in electric coffee makers.

A more detailed object of the invention is to monitor a thermostat in electric coffee makers by means of a sensing voltage sensor across the heater element or by means of a current-sensing device.

Another object is to provide an electric coffee maker controller that can be used separately from the coffee maker with an ON-OFF switch, regardless of the size or brand of the coffee maker.

A still further object is to provide a programmable WARM temperature controller to control the temperature of the coffee and protect the fresh taste of the coffee.

Yet another object of the invention is to provide programmable SHUT-OFF times for electric coffee makers.

It is also an object of the invention to provide a warning indicator as to when an electric coffee maker requires cleaning.

A still additional object of the invention is to provide apparatus for automatically cleaning an electric coffee maker.

It is also an object of the invention to store programmable settings in a non-volatile memory and to restore them on power-up if the AC line power is interrupted.

It is yet still a further object of the invention to provide apparatus for providing selectable coffee brewing strengths for different types of beverages and varying amounts of beverages, including coffee and other beverages.

Another object is to provide an efficient yet inexpensive apparatus for achieving the foregoing objects.

A yet further object is to provide an apparatus for achieving the foregoing objects which is independent of any automatic electric coffee maker and is universal so that it can be used with any automatic electric coffee maker, and can be plugged into an electric outlet and can have a receptacle for receiving the power cord of an automatic electric coffee maker.

These and other objects will become apparent from the description to follow and from the appended claims.

BRIEF DESCRIPTION OF THE DRAWINGS

FIG. 6A shows graphs of the temperature versus time and thermostat status during the WARM state in standard operation, and FIG. 6B shows the graphs of temperature versus time, thermostat status and relay status during WARM state heater regulation.

DESCRIPTION OF PREFERRED EMBODIMENTS OF THE INVENTION

Figure 4A:
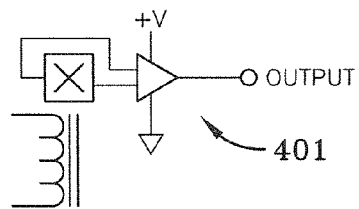
FIG. 4A is a schematic diagram of a Hall-effect current sensor.
Figure 4B:
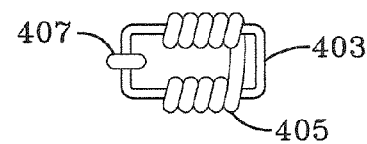
FIG. 4B is a Hall-effect sensor with a current sensor coil.
Figure 4C:
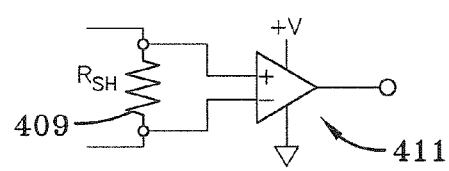
FIG. 4C is a resistive shunt current sensor.
Figure 4D:
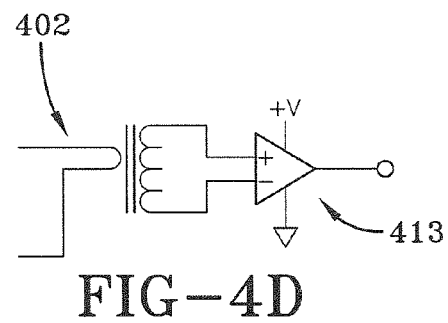
FIG. 4D is a current transformer as a current sensor.
Figure 4E:
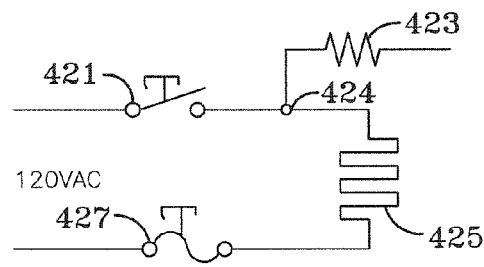
FIG. 4E is a voltage sensor.

An aspect of the invention relates to monitoring the condition of a thermostat 421 shown in FIG. 4E via either a voltage sensing resistor 423, or a current sensing device as discussed below. The voltage sensing resistor 423 is the simplest electrical device but requires a coffee maker controller to be installed in the coffee maker. A coffee maker controller diagram is shown schematically in FIG. 1 (and discussed below) with the dotted lines showing an alternate configuration to a thermostat 121, a voltage sensor 123, an electric heater 125 and a thermal fuse 127. The current sensing device allows for independent (stand alone) control of a coffee maker. The current sensing device provides control to any size or brand of coffee maker with an ON-OFF switch. It also requires that only the defective coffee maker with a switch has to be replaced, rather than requiring buying the coffee maker controller with its electronics over and over.

Another aspect of the invention is the provision of a programmable WARM temperature that allows the user to have coffee warmed from the thermostat temperature down to room temperature for a chosen number of levels. Taste tests indicate the black coffee at 130° to 140° F (54.4° to 60° C.) stayed fresh tasting up to four hours. People preferring cream or milk in their coffee indicated the 150° to 160° F. (65.5° to 71.1° C.) coffee tasted fresh after three hours. A preferred embodiment of the present invention provides a method and algorithm that enables the user to control the coffee maker WARM levels.

A further aspect for a preferred embodiment of the invention is a provision for programmable SHUT-OFF times: immediate; one hour; two hours; or four hours. A device for programmable SHUT-OFF times allows for tea and herbal brewing with immediate shut-off, one-hour shut-off for short duration consumption, standard two-hour shut-off, and four-hour shut-off for office and continuous use circumstances. It should be understood that other times or the number of times may be varied. The shut-off time selected and programmed by the user is stored in non-volatile memory. This prevents it from being lost or defaulted when power is lost.

Figure 3:
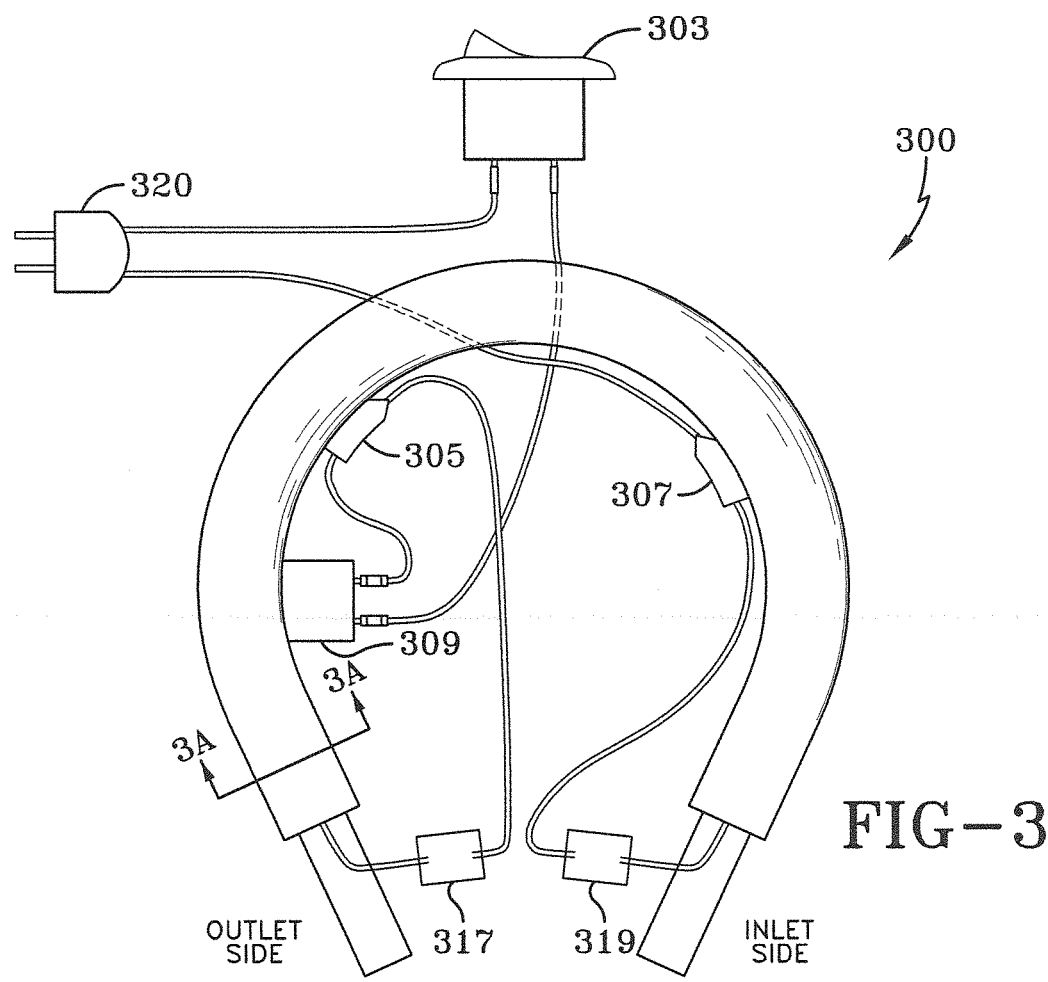
FIG. 3 is a schematic view of the heater water tube assembly.
Figure 3A:
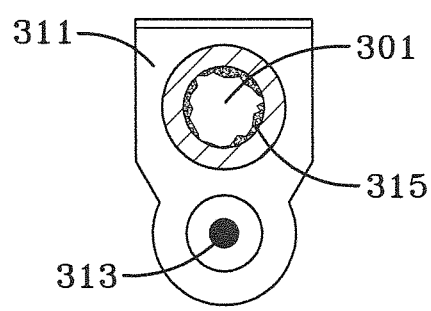
FIG. 3A is a view taken in the direction 3A-3A in FIG. 3.

A further aspect of the preferred embodiment of the invention is the provision of a blinking indicator light 105c (WARM) (FIG. 1) when mineral scale 315 (FIG. 3A) has built up inside the heater water tube 301, that requires cleaning.

Another part of the preferred embodiment of the invention is the provision of an automatic cleaning cycle that is implemented by filling the carafe 211 with white vinegar or water and a citric acid packet, then pouring the cleaning solution into the water chamber. By selecting the automatic cleaning cycle, the cleaning solution is slowly pumped through the machine in two to four hours. The boiling solution dissolves all of the scale deposits and is collected in the carafe 211. When the solution is fully pumped into the carafe, the coffee maker controller shuts OFF automatically.

Figure 1:
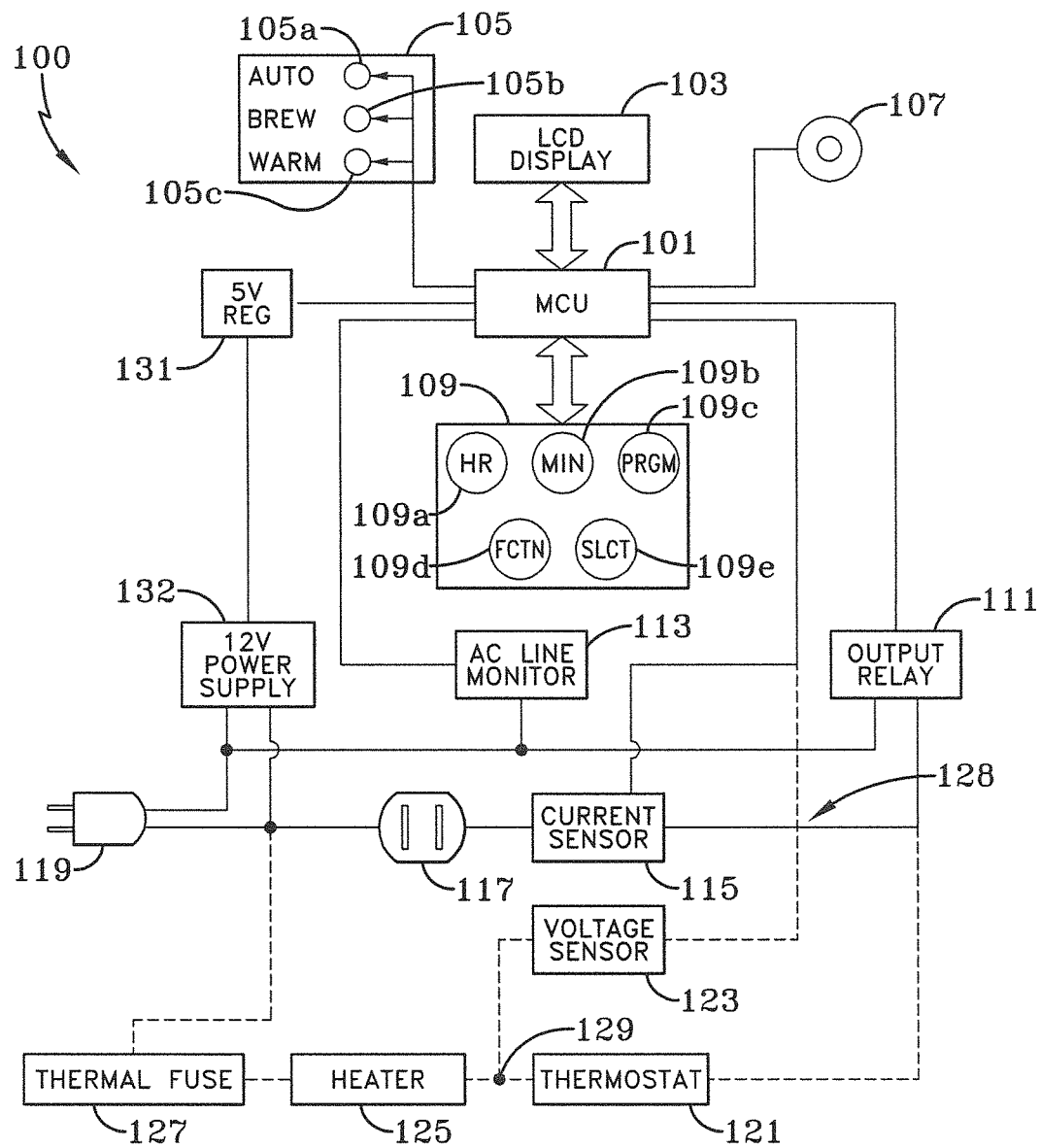
FIG. 1 is a view of the coffee maker controller circuitry in block diagram.
Figure 2:
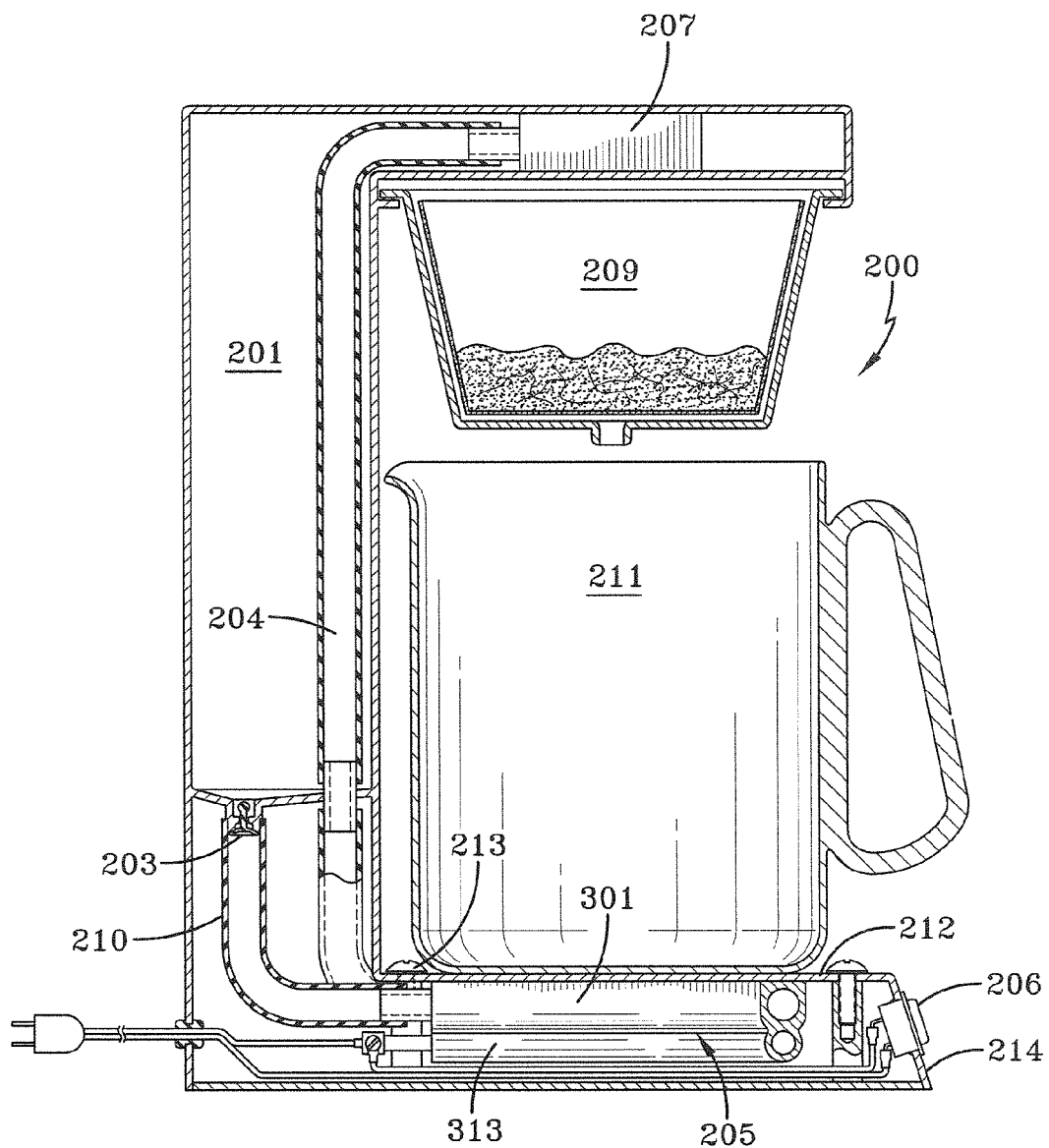
FIG. 2 is a schematic side view of the basic ADC coffee maker.

The block diagram for the preferred embodiment of the invention is illustrated in FIG. 1. A coffee maker controller 100, shown in block diagram form in FIG. 1, is comprised of a microcontroller ("MCU") 101, an LCD display 103, indicator lights 105 having an LED light 105a showing an automatic mode (or an AUTO state), an LED light 105b showing a brew mode (or a BREW state) and an LED light 105c showing a warm mode (or a WARM state), an audible annunciator 107, an input switching device in the form of momentary push-button switches 109 with respective designations of HR for hours, MIN for minutes, PRGM for PROGRAM, FCTN for FUNCTION and SLCT for SELECT in the respective switches 109a, 109b, 109c, 109d and 109e; a power switch in the form of an output relay 111, a current sensor 115, a power supply circuitry 130, an AC line monitor 113, an AC plug 119, and an output receptacle 117. The coffee maker 200, shown in FIG. 2, plugs into the output receptacle 117. An alternate voltage sensor scheme 128 is designated by the dotted lines connected to a thermostat 121, a voltage sensor 123, a heater 125 and a thermal fuse 127. The voltage sensor device requires the coffee maker controller 100 to be mounted in the coffee maker in order to connect the voltage sensor 123 to a heater-thermostat junction 129. Either device of connection uses the detection of the status of the thermostat 121 to provide functions to controller 100 for controlling the operation of controller 100. Controller 100 is powered by a 12 volt power supply circuitry 130 connected to a 5 volt regulator 131, which is in turn connected to microcontroller 101.

When the coffee maker controller 100 is plugged into an AC receptacle, the power supply circuitry 130 provides voltage to the microcontroller 101. The microcontroller 101 initializes the memory variables, uploads the stored program values therein in a manner known in the art, and initializes the LCD display 103. Next, microcontroller 101 measures the line frequency through AC line monitor 113 against its internal oscillator to determine if the line frequency is either 50 Hertz (for Europe and other countries) or 60 Hertz (for North America). Microcontroller 101 then sets a one second electronic beep flag that actuates the audible annunciator 107 for one second to announce that it is ready.

The ON-OFF switch 206 or 303, on the coffee maker 200 is turned ON after being connected to the output receptacle 117 of the coffee maker controller. The power to the coffee maker is now being controlled by the coffee maker controller output relay 111. The SLCT switch 109e is actuated to enable the user to manually change the operating state of the coffee maker controller 100. When the controller 100 is in the OFF state, pressing the SLCT switch 109e enables the AUTO state, which illuminates the LED 105a and sets the one second beep flag. In this state, the controller 100 will wait until either the SLCT switch 109e is pressed or until the actual time matches the BREW program time. Either condition will cause the controller to advance to the BREW state. The BREW state is initialized by turning OFF the AUTO LED 105a, turning ON the BREW LED 105b, setting the one second beep flag and turning ON the output relay 111. In the BREW state, the controller 100 monitors the condition of the thermostat 121 (or 309) by means of the current sensor 115 or voltage sensor 123. If the controller 100 is in the BREW state and the SLCT switch 109e is pressed, or if the current sensor 115 detects current (thermostat 121 is closed) and then detects no current (thermostat 121 is open), the controller 100 will advance to the WARM state. When the WARM state is initialized, BREW LED 105b is turned OFF, the WARM LED 105c is turned ON setting the one second beep flag and starting a HEATER LEVEL timing and CLEAN LIGHT timing algorithms. These timing algorithms measure and calculate the WARM heater level relay 111 $t_{calc}$ (OFF time) and measure whether the coffee maker 200 requires cleaning of mineral scale deposits 315. These algorithms will be further explained below. The WARM state concludes when either the SLCT switch 109e is pressed or the elapsed time equals the programmed SHUT-OFF time. The controller returns to the OFF state. The OFF state is initialized by turning OFF the output relay 111, setting the one second beep flag, and by microcontroller 101 turning OFF the WARM LED 105c provided that the clean flag is not set. If the clean flag is set, the WARM LED 105c will continue to blink.

The preferred embodiment of the coffee maker controller 100 uses a current sensor 115 to detect when the thermostat 309 of the attached coffee maker 200 is closed and is drawing heater current. There are several configurations of measuring current. One configuration is by using a resistive shunt 409 shown in FIG. 4C. When current passes through the shunt 409, a measurable voltage is produced that can indicate current flow. The shunt 409 creates heat and is directly connected to the line voltage 411 which creates safety issues related to electrical shock. A second configuration uses a current transformer 413 shown in FIG. 4D to produce a line isolated output voltage that can be measured to indicate current flow. This transformer method is bulky for high currents, and is also costly. A third configuration employs a Hall-effect sensor 407 which is sensitive to magnetic fields. By using a small number of turns of enameled wire 405 around a ferric (iron) based wire 403, a magnetic field is created which will turn the Hall-effect sensor 407 ON and OFF with the alternating line current. Depending on the time when the line current is turned OFF, the Hall-effect sensor 407, can maintain either a high or low logic output state due to residual magnetism in the iron core wire 403. By designing a firmware algorithm which interprets the output state of the Hall-effect sensor 407, the controller 100 can determine whether the thermostat 309 is open or closed. When the output of the Hall-effect sensor 407 is changing between high and low and high (ON and OFF and ON) for a specified number of times in a specified time interval, the thermostat 309 is closed and the coffee maker 200 is using current. When the output of Hall-effect sensor 407 is either high or low for a determined period of time, the thermostat 309 is open and no current is being used. The combination of Hall-effect sensor 407 with the ferric core coil 405 isolates the current measurement from the AC line and reduces the heat dissipation to nearly zero levels. The ferric core of ferric core coil 405 combined with the firmware algorithm enables higher sensitivity, lower cost materials, and stable readings. Another schematic diagram is shown in FIG. 4A, where a Hall-effect sensor 401 is shown sensing a magnetic coil 402 connected in series with a load. The thermostat 309 condition can also be determined by measuring the voltage across a heater 425 through a voltage sensor resistor 423 that is connected to a node 424 between a thermostat 421 and the heater 425 as shown in FIG. 4E. This configuration requires the coffee maker controller 100 to be mounted in the coffee make 200 to make the connection to the sense resistor 423. The same control actions and algorithms can be used with this configuration. The current sensing devices shown in FIGS. 4A, 4C, 4D allows for remote connection of a coffee maker controller 100 to a coffee maker 200.

Figure 5:
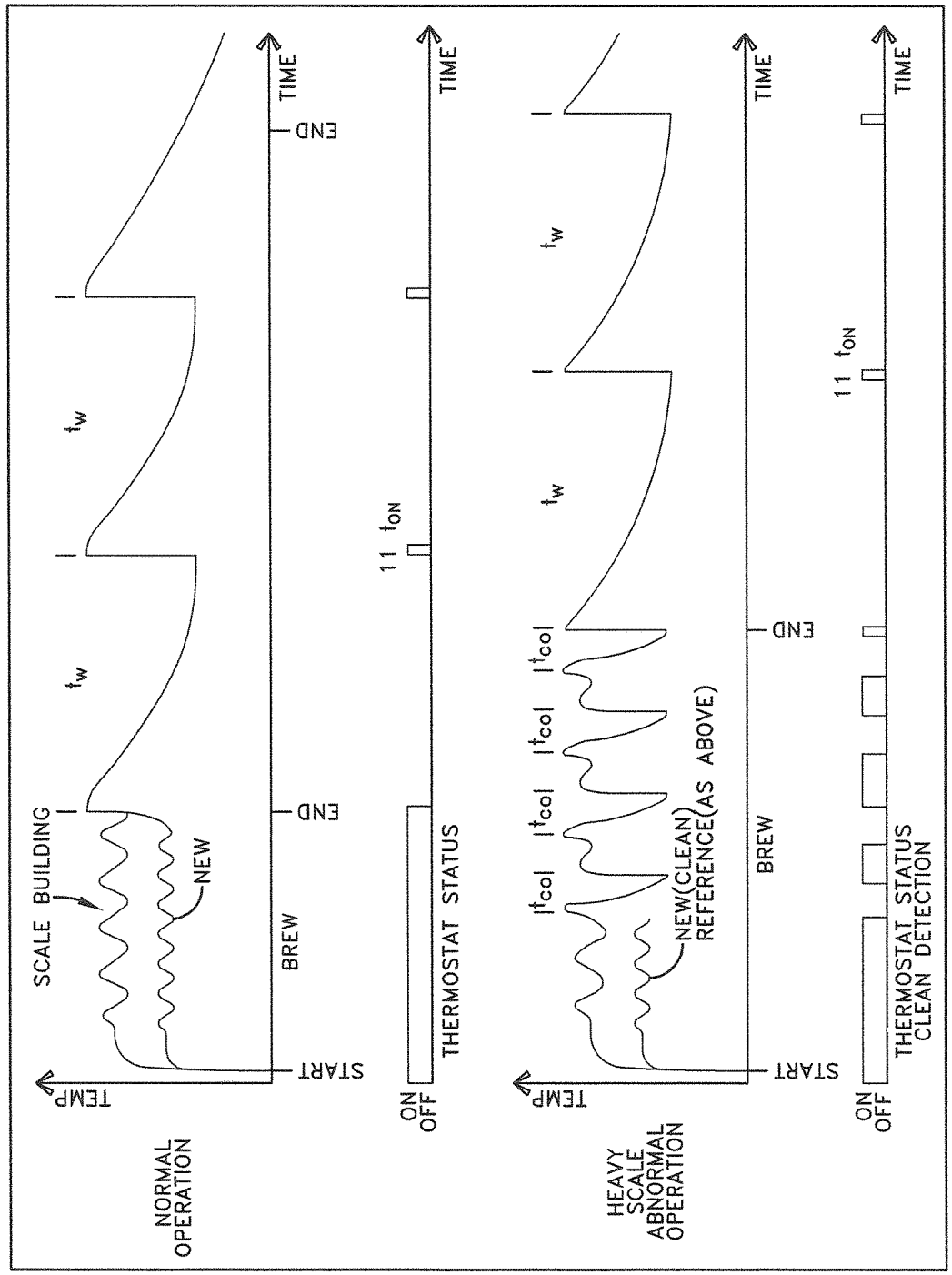
FIG. 5 shows graphs of the temperature versus time and thermostat status BREW cycle for normal operation and for abnormal operations due to heavy scale.
Figure 7A:
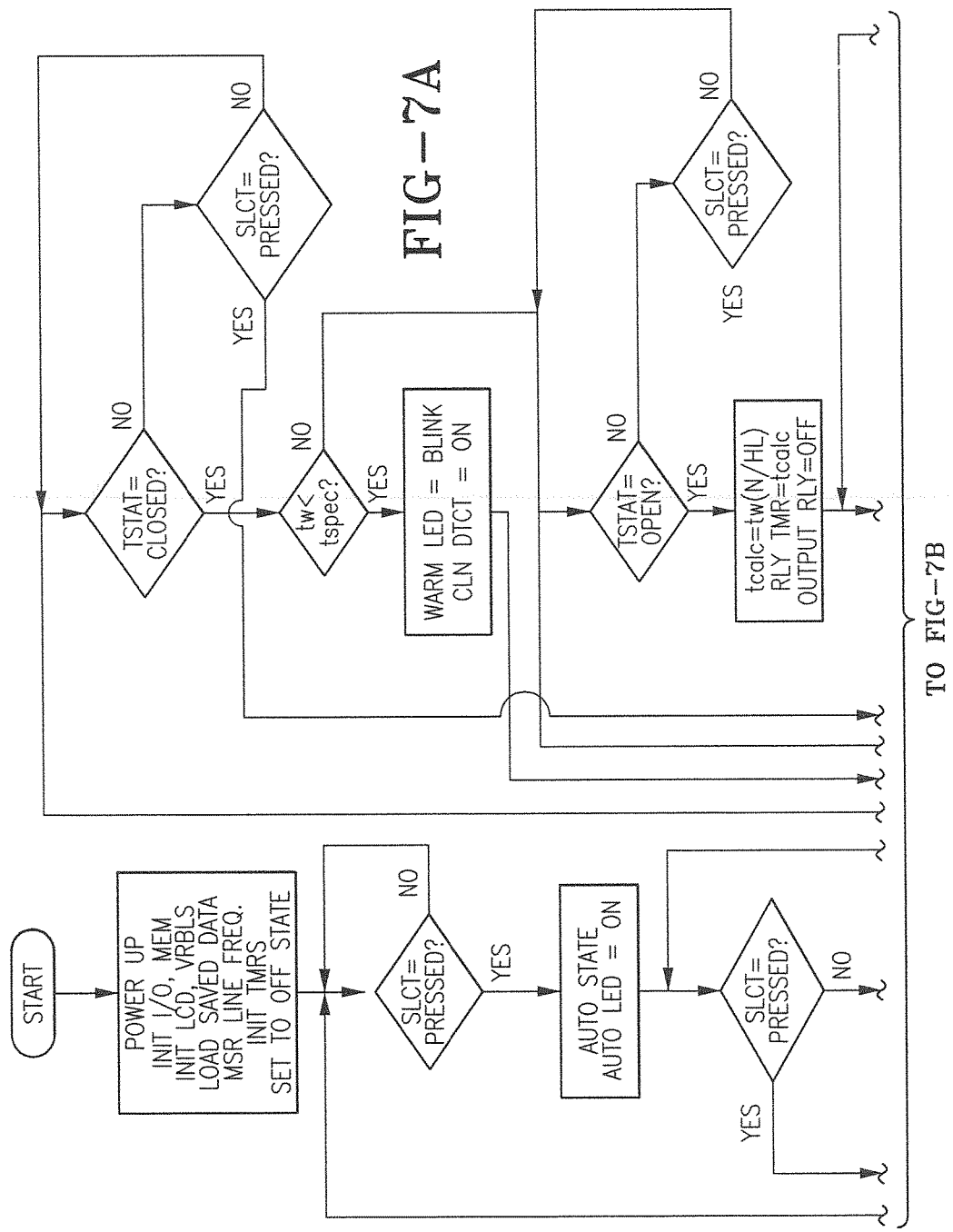
FIG. 7 is an operating state flow diagram.
Figure 7B:
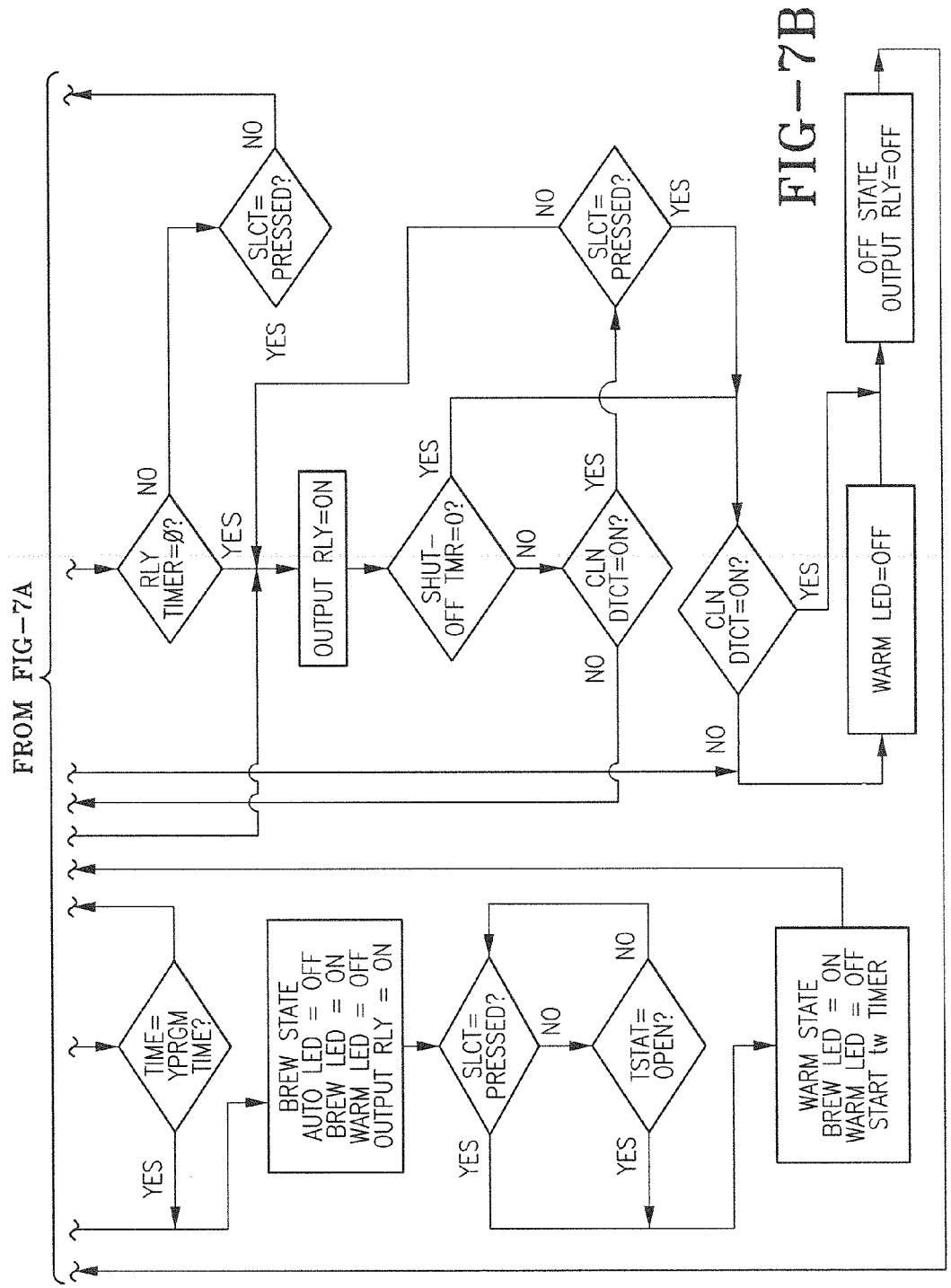

To determine the mineral scale build-up 315 within the heater water tube 301, an algorithm was developed to signal when the coffee maker requires cleaning (dissolving mineral scale build-up). FIG. 5 shows four related graphs. The bottom graph shows the ON-OFF status of thermostat 309 with heavy mineral deposit 315. The immediately above graph shows the thermostat temperature for automatic coffee machine 200 with heavy mineral deposit 315 build-up for heavy scale abnormal operation, as it fluctuates with time during an abnormal operating cycle. The next above graph shows the ON-OFF status of thermostat 309 during a normal operating cycle. The top graph shows the variation of thermostat temperature for a new water heater tube 301 over time and a heater water tube 301 with mineral scale 315 building therein for normal operation of the preferred embodiment of the invention. The initial time in each graph shows the start of brewing time. The thermostat temperature, in the brewing cycle, fluctuates slightly as the heater pumps the water periodically up to the infusion chamber. When the build-up of mineral scale 315 occurs within the heater water tube 301, the aluminum extrusion 311 and, hence, the temperature of thermostat 309 is elevated because the build-up of mineral scale 315 cannot effectively conduct heat to the water inside the heater water tube 301. At some point the steam and pumping action becomes slow preventing fresh water from entering the heater water tube 301. When the temperature of the aluminum extrusion 311 reaches the trip point of the thermostat 309, the heater 313 is turned OFF and the heater 313 cools. Because water is still in the water chamber 201 and the water tube 301, it flows through the unidirectional check valve 203 into the heater water tube 301 and rapidly cools the temperature of thermostat 309. This rapid cooling causes the thermostat 309 to close in time $t_{co}$. The short time $t_{co}$ between opening and then closing is the condition that indicates that the coffee maker needs cleaning. Additionally, this condition causes the brewing cycle to be extended due to the thermostat 309 cycling and causing reduced average power. This process is shown in FIG. 5 on the graph labeled "Heavy Scale Abnormal Operation." This causes boiling water to flow through the coffee grounds for a longer period of time, which extracts undesirable chemicals from the coffee grounds that are unhealthy and bad tasting. This invention looks for the opening and rapid reclosing of the thermostat 309 as the signal indicating that the build-up of mineral scale 315 needs to be cleaned. To alert the user to such a condition, the firmware algorithm measures the time from the opening of the thermostat 309 until it closes again. If the time between opening and closing $t_{co}$ is less than a specified time, the WARM LED 105c is flashed continuously until the next BREW state is initiated.

To provide for automatic cleaning of the build-up of mineral scale 315 in the heater water tube 301, a cleaning algorithm was developed to accomplish this task. To clean the coffee maker 200, the user fills the carafe with white vinegar or with water and a packet of citric acid crystals. The contents of the carafe 211 are emptied into the water reservoir 201. The user initiates the cleaning cycle by pressing and holding down the FCTN switch 109d and pressing the SLCT switch 109e. The LCD display 103 shows Cln. The algorithm turns ON the output relay 111 for a specified short period of time, followed by turning the output relay 111 OFF for a specified longer period of time. The specified ON to OFF time periods reduce the average power to the heater 313. The reduced power allows the coffeemaker 200 to slowly pump boiling acid through the heater water tube 301 to dissolve all of the mineral scale build-up 315 and remove it to the carafe 211. When all of the solution is pumped into the carafe 211, the heater 313 will rapidly rise in temperature, and the thermostat 309 will open. This is the signal condition that indicates the cleaning cycle is complete. The controller will cause the LCD display 103 to display DONE, the WARM LED 105c to turn OFF, and the one second beep flag to be set. The user then empties the carafe 211, fills the carafe 211 with water, empties it into the coffee maker water chamber 201, then runs a normal BREW cycle to flush any residual cleaner from the heater water tube 301.

The preferred embodiment of the invention incorporates a new configuration for controlling the coffee temperature in the carafe 201 in the WARM state after the BREW state is complete. Refer to FIGS. 6A and 6B for the following discussion. FIGS. 6A and 6B illustrate five related graphs. The bottom graph of FIG. 6A shows the ON-OFF state for output relay 111 during the time coffee maker 200 is ON. The graph immediately above shows ON-OFF status of thermostat 309 when the coffee maker 200 is ON and the heater 313 is being controlled by relay 111. The third graph shows the variation of the temperature of heater water tube 301 while the coffee maker 200 is ON during the BREW and part of the WARM state, when the heater 313 is being controlled by relay 111 and thermostat 309. Referring next to FIG. 6B, the lower graph shows the ON-OFF status of thermostat 309 while the coffee maker 200 is ON with no heater regulation. The top graph of FIG. 6B shows the variations of the temperature of water heater tube 301 for a new water tube 301 over time periods and during the operation of coffee maker 200 when it is operating with no heater regulation. At the end of the BREW state, during normal operation, all of the water has been pumped up to the infusion chamber 209, the temperature of heater 313 rises and the thermostat 309 opens. The heater 313 is OFF, and the heater assembly 205 gradually cools down. After a period of time $t_w$, the thermostat 309 closes, the heater 313 is ON, and the heater assembly 205 rapidly heats until the thermostat 309 again opens and the heater assembly 205 gradually cools down. This process continues until power is turned OFF to the coffee maker 200. The WARM temperature is set by the high trip point when the thermostat 309 opens and assumes the lower, differential temperature when the thermostat 309 closes. This long OFF short ON duty cycle reduces the average power of the heater 313 to keep the coffee in the carafe 211 WARM. Most coffee makers 200 choose the trip points of thermostat 309, heater wattage and thermal characteristics of the heater assembly 205 to maintain the coffee in the carafe 211 at 180° to 190° F. (82.2° to 87.8° C.). This temperature not only causes scalding, but causes the aromatic hydrocarbons (flavor molecules) to boil off at a high rate. This causes the coffee to taste bitter after a short period of time (one hour). The bitter molecules left behind are the phenols, polyolefins and other unhealthy, bad tasting chemicals. If the coffee WARM temperature is reduced to 130° to 140° F. (54.4° to 60° C.), the flavor molecules vaporize at an exponentially lower rate. This maintains the fresh coffee taste for up to four hours. To provide this fresh flavor for an extended period of time, a way was needed to reduce the average power to the heater 313. An algorithm was developed to do this function. When the thermostat 309 first opens, the BREW state is ended and the WARM state is initialized. The algorithm keeps the output relay 111 ON and waits for the thermostat 309 to close and reopen. It then measures the time $t_w$ until the thermostat 309 closes. This would represent the normal thermostat open or OFF time period. By multiplying the open, OFF time by the number of heater levels divided by the heater level selected, the output relay 111 can be turned OFF for a longer period of time to reduce the average power supplied by the heater 313 during the WARM state. This allows the coffee maker controller 100 to control the WARM temperature from the design temperature of thermostat 309 down to ambient room temperature. The formula for the output relay 111 OFF time $t_{calc}$ is:

$$t_{calc} = t_w \times NHL/HLS.$$

where $t_{calc}$=Output Relay 111, OFF time, $t_w$=warm time when the thermostat 309 is open, or OFF time during the keep warm mode, NHL=Number of Heater Levels, HLS=Heater Level Selected.
For example, if the Thermostat OFF time $t_w$=120 seconds, the Number of Levels=8, and the Heater Level Selected=4, then $t_{calc}$=120×8/4=240 seconds. If the normal thermostat ON time $t_{on}$, is 12 seconds, the normal duty cycle would produce an average keep warm thermostat power, $P_{KWT} = P_{FULL} = t_{on}/t_w = P_{FULL} \times 12/120$ or ten percent of the full power of the Heater in the WARM state, where $P_{KWT}$=Keep warm thermostat power and $P_{FULL}$=full power. If the user had selected Heater Level four as in the example, then the average keep warm controlled power, $P_{KWC} = P_{FULL} \times t_{on}/(t_w \times NHL/HLS) = P_{FULL} \times 12/(120 \times 8/4) = P_{FULL} \times 12/240$ or five percent of full power, where $P_{KWC}$=Keep warm controlled power. This would result in the WARM temperature being half of the normal WARM temperature or (190 nrmlF–70 rmF)×($P_{KWC}/P_{KWT}$)+70° F.=130° F., where nrmlF=normal Fahrenheit temperature, and rmF =room Fahrenheit temperature. This algorithm allows any number of levels to be used to control the WARM temperature from the thermostat normal design value down to the ambient room temperature value. As another example, since the thermostat ON time is constant, if $P_{KWT}$(keep warm thermostat power) is 50 watts, $t_w$=120 seconds, NHL=10, HLS=6, then $t_{calc}$×120(10/6)=200 seconds, $P_{KWC} = P_w \times t_w/t_{calc}$=50 watts×120/200=30 watts. Six tenths of the keep warm power results in a keep warm temperature $T_{kw}$, which equals $T_{rt}+[(T_{th}-T_{rm})P_{KWC}/P_{KWT}]$=70+[(190–70)×30/50]=142° F.=$T_{kw}$.

The preferred embodiment of this invention also provides for control of the BREW flavor level of the coffee. To enable this feature, the output relay 111, is turned ON and OFF in a repetitive pattern to reduce the power of heater 313 of the coffee maker 200, thus extending the BREW time and increasing the extraction of the flavor molecules from the coffee grounds, tea, or herbal materials. This feature is particularly useful for brewing tea, or brewing a small pot of coffee. When only half of a carafe of coffee is brewed, the full power time to pump the water through the coffee grounds is half of the normal full pot time. This doesn't allow for full extraction of the flavor molecules. To correct this deficiency, an algorithm was invented to allow the user to adjust the brewing heater power by controlling the output relay 111. The method uses a fixed period of time. This time period is divided into period segments. It is best to explain with an example. Let the fixed time period=$P_f$=40 seconds, the number of flavor levels is 5, the most time for brewing is twice that of a full pot. If the relay is ON all the time, the brewing time is the shortest. If the relay is ON half the time the brewing time would be twice as long. If five levels of brewing strength were desired, the duty cycle period would be:

(40 SEC–20 SEC)/(NL–1)=5 seconds per level.
Where NL=5=number of levels.

To implement this duty cycle control, two variables are used: The first variable is the ON time, and the second variable is the period time. They count down concurrently. The ON time variable is 40 SEC if the full pot flavor level is selected. They reach zero at the same time so the output relay 111, is always ON. If the half pot flavor level is selected, the ON time variable is 20 SEC. The formula for flavor level ON time is:

$$FL_{ont}=\text{Time period}-(((\text{time period}-\text{least time period})/(NL-1))\times(FL-1)),$$

where the flavor level for a full pot=1, $FL_{tp}$=time period, FL=flavor level selected, and NL=number of flavor levels. Combining both equations yields:

$$P_{FL}=P_{FULL}\times(FL_{ont}/FL_{tp})=P_{FULL}\times[1-((FL_{tp}-\text{least time period})/(FL_{tp}\times(NL-1))\times(FL-1)).$$

Substituting the flavor level yields:
FL=1, FLont=Period time=40 SEC
FL=2, FLont=35 SEC
FL=3, FLont=30 SEC
FL=4, FLont=25 SEC
FL=5, FLont=20 SEC
At the end of the Flavor Level ON time, the output relay 111 is turned OFF. At the end of the period time, the two timer variables are reset and the output relay 111 is turned ON. By using this method, no DC rectified currents are imposed on the AC power line. The ON-OFF duty cycle controls the average brewing power to control the flavor level of the brewed beverage. An alternate example to describe the flavor setting algorithm is as follows:
If you choose a minimum ON time, $T_{on\ min}$, of 20 seconds, a minimum ON time percentage, % min, of 20%=0.2, and a maximum number of flavor levels, $FL_{max}$, 8 in this example, then the average power, $P_{av}$, is equal to the full heater power, $P_{FULL}$, times the output relay (111), ON time, $T_{on}$, divided by the period time, $T_{period}$, or $P_{av}=P_{FULL}*(T_{on}/T_{period})$. $T_{period}=T_{on\ min}/\%\ min$. $T_{on}=T_{on\ min}+(T_{on\ min}/\%\ min - T_{on\ min})*(FL/FL_{max})$.
Combining and substituting the equations yields:

$$P_{av}=P_{FULL}*(T_{on}/T_{period})=P_{FULL}*[T_{on\ min}+(T_{on\ min}/\%\ min-T_{on\ min})*(FL/FL_{max})/(T_{on\ min}/\%\ min)],$$

Simplifying the equation yields:

$$P_{av}=P_{FULL}*(\% \ min*(1-(FL/FL_{max})+(FL/FL_{max})).$$

Note that the minimum ON time, $T_{on\ min}$, and the period time, $T_{period}$, drop out of the equations for calculating the value of $P_{av}$.

The invention has been described with particular emphasis in the preferred embodiments, but variations and modifications may occur to those skilled in the art from the foregoing description and from the appended claims.

What is claimed is:

1. A coffee maker controller for controlling the operation of an electric coffee maker, the electric coffee maker being configured to be powered by an AC power source and having an electrically powered heater operatively connected in series with a power switch, a thermostat, and a thermal fuse, said coffee maker controller comprising:
    a programmable microcontroller controlled by programmable logic, said programmable microcontroller having initializable memory variables, stored program values and settable user programmable time and user operating systems;
    a power supply electrically connected to said microcontroller for powering said microcontroller;
    an output relay interconnecting said programmable microcontroller and power supply;
    said programmable microcontroller having an algorithm for controlling the operation of said programmable microcontroller;
    said algorithm evaluating the state of said coffeemaker thermostat status to operate said output relay;
    a switching device electronically connected to said programmable microcontroller for selecting the operating state and for setting the user programmable operating settings;
    an LCD display electronically connected to said programmable microcontroller for displaying the time and user selected operating settings;
    a current sensing device connectable in series with the electrically powered heater for detecting current through the heater, said current sensing device being selected from the group consisting of a Hall-effect sensor coil connected in series with the output relay; a Hall-effect sensor with magnetic coil having enamelled copper wire wound around a ferric iron wire, said magnetic coil having a gap to induce a magnetic field through said Hall-effect sensor; a resistive shunt connected in series with the output relay; a current transformer primary in series with the output relay; and said current sensing device being electrically connected to said microcontroller to switch the operating mode of the said microcontroller according to the output of said sensor; and
    an AC plug electrically connected to said power supply, said sensor device and said output relay for conveying electrical power to said power supply, said sensor and said output relay upon being plugged into an AC power receptacle.

2. A coffee maker controller according to claim 1 for being connected to sense the open or closed status of the thermostat, the thermostat having an open status for being open for a time period $t_w$, said current sensing device sensing when $t_w$ is less than a specified length of time and sending a timing signal to said algorithm in said programmable microcontroller, said microcontroller transmitting a signal to said LED display to effect a recognizable optical signal indicating the coffee maker requires cleaning, and said programmable microcontroller monitoring said output relay in an ON condition for a predetermined WARM state time period.

3. A coffee maker controller according to claim 2, the coffee maker having an electrically actuable pump with an ON and OFF switch and thermostat, and said programmable microcontroller being electrically connected to said switch, wherein a user of the coffee maker can fill the coffee maker with an acidic solution in response to said recognizable optical signal and can manually initiate an automatic cleaning signal, and said algorithm alternatively generating ON and OFF signals to said output relay, and to said ON-OFF switch and thermostat of the pump to pump the acidic cleaning solution through the coffee maker to dissolve the mineral scale deposits; and said microcontroller being functional with respect to said ON-OFF switch of the pump in response to a manually operated control or in response to the opening of the thermostat to end the cleaning cycle.

4. A coffee maker controller according to claim 1 wherein the coffee maker has a heater, and said coffee maker controller includes a duty cycle power switch device connectable to the heater for setting the power to the heater according to the formula:

$$P_{FL}=P_{FULL}\times(FL_{on}/FL_{tp})=P_{FULL}\times[1-((FL_{tp}-\text{least time period})/(FL_{tp}\times(NL-1)\times(FL-1))]$$

where $P_{FL}$=power per flavor setting,
$P_{FULL}$=full power of heater,
$FL_{on}$=flavor level power switch ON time
$FL_{tp}$=arbitrarily set time period
NL=number of flavor levels
FL=flavor level setting=power setting arbitrarily set to a user's desired flavor of the coffee.

5. A coffee maker controller according to claim 1 wherein the coffee maker has a heater, and said coffee maker controller includes a power switch device connectable to the heater for setting the keep-warm power to the heater according to the formula:

$$P_{KWC}=P_{FULL}\times(t_{on}/t_{calc})=P_{FULL}\times(t_{on}/(t_w\times NHL/HLS))$$

where $P_{FULL}$=full power of heater,
$P_{KWC}$=keep warm controlled power,
$t_{on}$=the thermostat ON time in keep warm state,
$t_w$=normal thermostat OFF time in keep warm state,
$t_{calc}$=calculated OFF time for power switch device,
NHL=number of heater levels, and
HLS=heater level selected.

6. A coffee maker controller according to claim 1 and further comprising an LED display device electrically connected to and controlled by said programmable controller for selectively indicating the state of the electric coffee maker.

7. A coffee maker controller according to claim 1 and further including an annunciator electronically connected to said programmable microcontroller.

8. A control device for controlling the operation of an electric automatic drip coffee maker having a power switch, a heater, a thermal fuse, a thermostat having a thermostat status and being connected in series with the heater for terminating electricity to the heater if the temperature of the heater exceeds a predetermined threshold, said control device comprising:
    a power controller for being supplied by an AC power source, said power controller being settable with user settings to a desired output and being programmable by a programmable logic; said power controller comprising:

a power switch for selectively supplying power from the AC power source to the electric automatic drip coffeemaker;

a current sensor for sensing the status of the thermostat of the coffee maker, said sensor is a Hall-effect sensor with magnetic coil, said magnetic coil comprising an enameled copper wire wound upon a ferric iron wire; said magnetic coil having a gap to induce a magnetic field through said Hall-effect sensor;

a display device showing the time of day and user settings;

an input switching device for operating said control device and programming user settings into said power controller; and a control apparatus for inputting the thermostat status into said power controller, and control algorithms for evaluating said thermostat status to operate the power controller.

9. A control device according to claim 8 wherein the thermostat has an open time period, $t_w$, and a closed time period, wherein in response to the open time period $t_w$ being greater than a specified length of time, the control algorithm calculates a relay OFF time, $t_{calc}$, that is equal to the thermostat open time, $t_w$, times the Number of Heater Levels, NHL, divided by the Heater Level Selected, HLS, by the user, given by the formula: $_{calc}=t_w*(NHL/HLS)$; and said power switch OFF time reducing the power to said coffee maker in the WARM state.

10. A control device according to claim 8 wherein the thermostat has an open time period $t_w$ and a closed time period, and wherein said display device is actuated to indicate that the coffee maker requires cleaning in response to the thermostat open time $t_w$ being less than a predetermined length of time, and said control device maintains said power switch in the ON condition for the remaining WARM state time period.

11. A control device according to claim 8 wherein the coffee maker can be cleaned by filling the coffee maker with an acidic cleaning agent, and said power controller is manually operable to initiate the automatic cleaning cycle; said power controller initiating said cleaning cycle to provide brief ON and extended OFF times to slowly pump acidic cleaning agent through the coffee maker and dissolving mineral scale deposits; and said cleaning cycle ending by a selected one of a manual command or the direction by said controller of an open thermostat.

12. A control device according to claim 8 wherein said control algorithms include an algorithm by duty cycle limiting of the power to the heater to control the brew strength of the coffee and said power level is manually set according to the formula:

$P_{av}=P_{FULL}*[T_{on}/T_{period}]=P_{FULL}*$ (% min*(1−(FL/FL$_{max}$)+(FL/ FL$_{max}$)), wherein P$_{av}$ is average power, P$_{FULL}$ is full power of the heater, T$_{on}$ is the ON time of the power switch, and T$_{period}$ is the chosen duty cycle time % min is the decimal value for the minimum ON time percentage of the period time, FL is the flavor level setting, and FL$_{max}$ is the maximum number of flavor settings.

13. A control device according to claim 8 wherein said power controller further includes a display device actuable to indicate the control state of said control device.

14. A control device according to claim 8 and further including an audible annunciator device to indicate a change of a control state of said control device.

15. A coffee maker controller for controlling the operation of an electric coffee maker, the electric coffee maker being configured to be powered by an AC power source and having an electrically powered heater operatively connected in series with a power switch, a thermostat, and a thermal fuse, said coffee maker controller comprising:

a programmable microcontroller controlled by programmable logic, said programmable microcontroller having initializable memory variables, stored program values and settable user programmable time and user operating systems;

a power supply electrically connected to said microcontroller for powering said microcontroller;

an output relay interconnecting said programmable microcontroller and power supply;

said programmable microcontroller having an algorithm for controlling the operation of said programmable microcontroller;

said algorithm evaluating the state of said coffeemaker thermostat status to operate said output relay;

a switching device electronically connected to said programmable microcontroller for selecting the operating state and for setting the user programmable operating settings;

an LCD display electronically connected to said programmable microcontroller for displaying the time and user selected operating settings;

a current sensing device connectable in series with the electrically powered heater for detecting current through the heater, said sensor device being electrically connected to said microcontroller to switch the operating mode of the said microcontroller according to the output of said sensor;

an AC plug electrically connected to said power supply, said sensor device and said output relay for conveying electrical power to said power supply, said sensor and said output relay upon being plugged into an AC power receptacle; and a duty cycle power switch device connectable to the heater for setting the power to the heater according to the formula:

$$P_{FL}=P_{FULL}\times(FL_{on}/FL_{tp})=P_{FULL}\times[1-((FL_{tp}-\text{least time period})/(FL_{tp}\times(NL-1)\times(FL-1))]$$

where $P_{FL}$=power per flavor setting,
$P_{FULL}$=full power of heater,
$FL_{on}$=flavor level power switch ON time
$FL_{tp}$=arbitrarily set time period
NL=number of flavor levels
FL=flavor level setting=power setting arbitrarily set to a user's desired flavor of the coffee.

16. A coffee maker controller according to claim 15 wherein said current sensing device, said current sensing device being selected from the group consisting of a Hall-effect sensor coil connected in series with the output relay; a Hall-effect sensor with magnetic coil having enamelled copper wire wound around a ferric iron wire, said coil having a gap to induce a magnetic field through said Hall-effect sensor; a resistive shunt connected in series with the output relay; and a current transformer primary in series with the output relay.

17. A coffee maker controller according to claim 15 for being connected to sense the open or closed status of the thermostat, the thermostat having an open status for being open for a time period $t_w$, said sensor device sensing when $t_w$ is less than a specified length of time and sending a timing signal to said algorithm in said programmable microcontroller, said microcontroller transmitting a signal to said LED display to effect a recognizable optical signal indicating the coffee maker requires cleaning, and said programmable microcontroller monitoring said output relay in an ON condition for a predetermined WARM state time period.

18. A coffee maker controller according to claim 15, the coffee maker having an electrically actuable pump with an ON and OFF switch and thermostat, and said programmable microcontroller being electrically connected to said switch, wherein a user of the coffee maker can fill the coffee maker with an acidic solution in response to said recognizable optical signal and can manually initiate an automatic cleaning signal, and said algorithm alternatively generating ON and OFF signals to said output relay, and to said ON-OFF switch and thermostat of the pump to pump the acidic cleaning solution through the coffee maker to dissolve the mineral scale deposits; and said microcontroller being functional with respect to said ON-OFF switch of the pump in response to a manually operated control or in response to the opening of the thermostat to end the cleaning cycle.

19. A coffee maker controller according to claim 15 wherein the coffee maker has a heater, and said coffee maker controller includes a power switch device connectable to the heater for setting the keep-warm power to the heater according to the formula:

$$P_{KWC}=P_{FULL} \times (t_{on}/t_{calc}) = P_{FULL} \times (t_{on}/(t_w \times NHL/HLS))$$

where $P_{FULL}$=full power of heater,
$P_{KWC}$=keep warm controlled power,
$t_{on}$=the thermostat ON time in keep warm state,
$t_w$=normal thermostat OFF time in keep warm state,
$t_{calc}$=calculated OFF time for power switch device,
NHL=number of heater levels, and
HLS=heater level selected.

20. A coffee maker controller according to claim 15 and further comprising an LED display device electrically connected to and controlled by said programmable controller for selectively indicating the state of the electric coffee maker.

21. A coffee maker controller according to claim 15 and further including an annunciator electronically connected to said programmable microcontroller.

22. A coffee maker controller for controlling the operation of an electric coffee maker, the electric coffee maker having a heater and being configured to be powered by an AC power source and having an electrically powered heater operatively connected in series with a power switch, a thermostat, and a thermal fuse, said coffee maker controller comprising:
- a programmable microcontroller controlled by programmable logic, said programmable microcontroller having initializable memory variables, stored program values and settable user programmable time and user operating systems;
- a power supply electrically connected to said microcontroller for powering said microcontroller;
- an output relay interconnecting said programmable microcontroller and power supply;
- said programmable microcontroller having an algorithm for controlling the operation of said programmable microcontroller;
- said algorithm evaluating the state of said coffeemaker thermostat status to operate said output relay;
- a switching device electronically connected to said programmable microcontroller for selecting the operating state and for setting the user programmable operating settings;
- an LCD display electronically connected to said programmable microcontroller for displaying the time and user selected operating settings;
- a sensor device selected from the group consisting of a voltage sensing device for sensing voltage across the electrically powered heater and a current sensing device connectable in series with the electrically powered heater for detecting current through the heater, said sensor device being electrically connected to said microcontroller to switch the operating mode of the said microcontroller according to the output of said sensor;
- an AC plug electrically connected to said power supply, said sensor device and said output relay for conveying electrical power to said power supply, said sensor and said output relay upon being plugged into an AC power receptacle; and
- a power switch connectable to the heater for setting the keep-warm to the heater according to the formula:

$$P_{KWC}=P_{FULL} \times (t_{on}/t_{calc}) = P_{FULL} \times (t_{on}/(t_w \times NHL/HLS))$$

where $P_{FULL}$=full power of heater,
$P_{KWC}$=keep warm controlled power,
$t_{on}$=the thermostat ON time in keep warm state,
$t_w$=normal thermostat OFF time in keep warm state,
$t_{calc}$=calculated OFF time for power switch device,
NHL=number of heater levels, and
HLS=heater level selected.

23. A coffee maker controller according to claim 22 wherein said sensor device is a current sensing device, said current sensing device being selected from the group consisting of a Hall-effect sensor coil connected in series with the output relay; a Hall-effect sensor with magnetic coil having enamelled copper wire wound around a ferric iron wire, said magnetic coil having a gap to induce a magnetic field through said Hall-effect sensor; a resistive shunt connected in series with the output relay; and a current transformer primary in series with the output relay.

24. A coffee maker controller according to claim 22 for being connected to sense the open or closed status of the thermostat, the thermostat having an open status for being open for a time period $t_w$, said sensor device sensing when $t_w$ is less than a specified length of time and sending a timing signal to said algorithm in said programmable microcontroller, said microcontroller transmitting a signal to said LED display to effect a recognizable optical signal indicating the coffee maker requires cleaning, and said programmable microcontroller monitoring said output relay in an ON condition for a predetermined WARM state time period.

25. A coffee maker controller according to claim 24, the coffee maker having an electrically actuable pump with an ON and OFF switch and a thermostat, and said programmable microcontroller being electrically connected to said switch, wherein a user of the coffee maker can fill the coffee maker with an acidic solution in response to said recognizable optical signal and can manually initiate an automatic cleaning signal, and said algorithm alternatively generating ON and OFF signals to said output relay, and to said ON-OFF switch and thermostat of the pump to pump the acidic cleaning solution through the coffee maker to dissolve the mineral scale deposits; and said microcontroller being functional with respect to said ON-OFF switch of the pump in response to a manually operated control or in response to the opening of the thermostat to end the cleaning cycle.

26. A coffee maker controller according to claim 22 wherein the coffee maker has a heater, and said coffee maker controller includes a duty cycle power switch device connectable to the heater for setting the power to the heater according to the formula:

$$P_{FL}=P_{FULL} \times (FL_{ont}/FL_{tp})=P_{FULL} \times [1-((FL_{tp}-\text{least time period})/(FL_{tp} \times (NL-1) \times (FL-1))]$$

where $P_{FL}$=power per flavor setting,
$P_{FULL}$=full power of heater,
$FL_{ont}$=flavor level power switch ON time
$FL_{tp}$=arbitrarily set time period
NL=number of flavor levels
FL=flavor level setting=power setting arbitrarily set to a user's desired flavor of the coffee.

27. A coffee maker controller according to claim 22 and further comprising an LED display device electrically connected to and controlled by said programmable controller for selectively indicating the state of the electric coffee maker.

28. A coffee maker controller according to claim 22 and further including an annunciator electronically connected to said programmable microcontroller.

29. A control device for controlling the operation of an electric automatic drip coffee maker having a power switch, a heater, a thermal fuse, a thermostat having a thermostat status and being connected in series with the heater for terminating electricity to the heater if the temperature of the heater exceeds a predetermined threshold, said control device comprising:
   a power controller for being supplied by an AC power source, said power controller being settable with user settings to a desired output and being programmable by a programmable logic; said power controller comprising:
      a power switch for selectively supplying power from the AC power source to the electric automatic drip coffeemaker;
      a sensor for sensing the status of the thermostat of the coffee maker, said sensor being selected from the group consisting of current sensor and a voltage sensor;
      a display device showing the time of day and user settings;
      an input switching device for operating said control device and programming user settings into said power controller; and
      a control apparatus for inputting the thermostat status into said power controller, and control algorithms for evaluating said thermostat status to operate the power controller, wherein said control algorithms include an algorithm by duty cycle limiting of the power to the heater to control the brew strength of the coffee and said power level is manually set according to the formula:
      $P_{av}=P_{FULL}*[T_{on}/T_{period}]=P_{FULL}*$ (% min*(1−(FL/FL$_{max}$)+(FL/FL$_{max}$)), wherein $P_{av}$ is average power, $P_{FULL}$ is full power of the heater, $T_{on}$ is the ON time of the power switch, and $T_{period}$ is the chosen duty cycle time % min is the decimal value for the minimum ON time percentage of the period time, FL is the flavor level setting, and FL$_{max}$ is the maximum number of flavor settings.

30. A control device according to claim 29 wherein said sensor is a current sensing device being selected from the group consisting of a Hall-effect sensor coil connected in series with the output relay; a Hall-effect sensor with magnetic coil having enamelled copper wire wound around a ferric iron wire, said magnetic coil having a gap to induce a magnetic field through said Hall-effect sensor.

31. A control device according to claim 29 wherein the thermostat has an open time period, $t_w$, and a closed time period, wherein in response to the open time period $t_w$ being greater than a specified length of time, the control algorithm calculates a relay OFF time, $t_{calc}$, that is equal to the thermostat open time, $t_w$, times the Number of Heater Levels, NHL, divided by the Heater Level Selected, HLS, by the user, given by the formula: $t_{calc}=t_w*(NHL/HLS)$; and said power switch OFF time reducing the power to said coffee maker in the WARM state.

32. A control device according to claim 29 wherein the thermostat has an open time period $t_w$ and a closed time period, and wherein said display device is actuated to indicate that the coffee maker requires cleaning in response to the thermostat open time $t_w$ being less than a predetermined length of time, and said control device maintains said power switch in the ON condition for the remaining WARM state time period.

33. A control device according to claim 29 wherein the coffee maker can be cleaned by filling the coffee maker with an acidic cleaning agent, and said power controller is manually operable to initiate the automatic cleaning cycle; said power controller initiating said cleaning cycle to provide brief ON and extended OFF times to slowly pump acidic cleaning agent through the coffee maker and dissolving mineral scale deposits; and said cleaning cycle ending by a selected one of a manual command or the direction by said controller of an open thermostat.

34. A control device according to claim 29 wherein said power controller further includes a display device actuable to indicate the control state of said control device.

35. A control device according to claim 29 and further including an audible annunciator device to indicate a change of a control state of said control device.

36. A control device for controlling the operation of an electric automatic drip coffee maker having a power switch, a heater, a thermal fuse, a thermostat having each of a thermostat status and being connected in series with the heater for terminating electricity to the heater if the temperature of the heater exceeds a predetermined threshold, and an open time period $t_w$ being greater than a specified time period, said control device comprising:
   a power controller for being supplied by an AC power source, said power controller being settable with user settings to a desired output and being programmable by a programmable logic; said power controller comprising:
      a power switch for selectively supplying power from the AC power source to the electric automatic drip coffeemaker, wherein said power switch has a power switch OFF time;
      sensor for sensing the status of the thermostat of the coffee maker, said sensor being selected from the group consisting of a current sensor and a voltage sensor;
      a display device showing the time of day and user settings;
      an input switching device for operating said control device and programming user settings into said power controller; and
      a control apparatus for inputting the thermostat status into said power controller, and control algorithms for evaluating said thermostat status to operate the power controller, said controller algorithms including a control algorithm for calculating a relay OFF time, $t_{calc}$, that is equal to the thermostat open time, $t_w$, times the Number of Heater Levels, NHL, divided by the Heater Level Selected, HLS, by the user, given by the formula: $t_{calc}=t_w*(NHL/HLS)$; and said power switch OFF time reducing the power to said coffee maker in the WARM state.

37. A control device according to claim 36 wherein said sensor is a current sensing device being selected from the group consisting of a Hall-effect sensor coil connected in series with the output relay; a Hall-effect sensor with magnetic coil having enamelled copper wire wound around a ferric iron wire, said magnetic coil having a gap to induce a magnetic field through said Hall-effect sensor.

38. A control device according to claim 36 wherein the thermostat has a closed time period, wherein in response to the open time period $t_w$ being greater than a specified length of time, the control algorithm calculates a relay OFF time, $t_{calc}$, that is equal to the thermostat open time, $t_w$, times the Number of Heater Levels, NHL, divided by the Heater Level Selected, HLS, by the user, given by the formula: $t_{calc}=t_w*(NHL/HLS)$; and said power switch OFF time reducing the power to said coffee maker in the WARM state.

39. A control device according to claim 36 wherein the coffee maker can be cleaned by filling the coffee maker with an acidic cleaning agent, and said power controller is manually operable to initiate the automatic cleaning cycle; said power controller initiating said cleaning cycle to provide brief ON and extended OFF times to slowly pump acidic cleaning agent through the coffee maker and dissolving mineral scale deposits; and said cleaning cycle ending by a selected one of a manual command or the direction by said controller of an open thermostat.

40. A control device according to claim 36 wherein said control algorithms include an algorithm by duty cycle limiting of the power to the heater to control the brew strength of the coffee and said power level is manually set according to the formula:

$P_{av} = P_{FULL}*[T_{on}/T_{period}] = P_{FULL} * (\% \ min*(1-(FL/FL_{max})+(FL/FL_{max}))$, wherein $P_{av}$ is average power, $P_{FULL}$ is full power of the heater, $T_{on}$ is the ON time of the power switch, and $T_{period}$ is the chosen duty cycle time % min is the decimal value for the minimum ON time percentage of the period time, FL is the flavor level setting, and $FL_{max}$ is the maximum number of flavor settings.

41. A control device according to claim 36 wherein said power controller further includes a display device actuable to indicate the control state of said control device.

42. A control device according to claim 36 and further including an audible annunciator device to indicate a change of a control state of said control device.

* * * * *